United States Patent
Lee et al.

(10) Patent No.: US 12,500,696 B2
(45) Date of Patent: Dec. 16, 2025

(54) POLAR CODE-BASED DECODING METHOD AND APPARATUS

(71) Applicant: POSTECH Research and Business Development Foundation, Pohang-si (KR)

(72) Inventors: Youngjoo Lee, Pohang-si (KR); Young Seok Kim, Pohang-si (KR); Dain Park, Pohang-si (KR)

(73) Assignee: POSTECH RESEARCH AND BUSINESS DEVELOPMENT FOUNDATION, Pohang-si (KR)

(*) Notice: Subject to any disclaimer, the term of this patent is extended or adjusted under 35 U.S.C. 154(b) by 1 day.

(21) Appl. No.: 18/458,945

(22) Filed: Aug. 30, 2023

(65) Prior Publication Data

US 2024/0178938 A1 May 30, 2024

(30) Foreign Application Priority Data

Nov. 25, 2022 (KR) .......................... 10-2022-0160355

(51) Int. Cl.
*H04L 1/00* (2006.01)
*H03M 13/00* (2006.01)
*H03M 13/11* (2006.01)

(52) U.S. Cl.
CPC .......... *H04L 1/0063* (2013.01); *H04L 1/0052* (2013.01); *H03M 13/00* (2013.01)

(58) Field of Classification Search
CPC ... H04L 1/0063; H04L 1/0052; H04L 1/0057; H03M 13/09; H03M 13/13; H03M 13/3927; H03M 13/6575
See application file for complete search history.

(56) References Cited

U.S. PATENT DOCUMENTS

| | | | | |
|---|---|---|---|---|
| 10,615,825 | B2* | 4/2020 | Sarkis | H04L 1/0045 |
| 11,005,596 | B2* | 5/2021 | Ahn | H04L 1/0045 |
| 11,095,396 | B2* | 8/2021 | Lin | H04L 1/0052 |

(Continued)

OTHER PUBLICATIONS

A. Balatsoukas-Stimming, M. B. Parizi and A. Burg, "LLR-Based Successive Cancellation List Decoding of Polar Codes," in IEEE Transactions on Signal Processing, vol. 63, No. 19, pp. 5165-5179, Oct. 1, 2015, doi: 10.1109/TSP.2015.2439211.

(Continued)

*Primary Examiner* — Justin R Knapp
(74) *Attorney, Agent, or Firm* — Morgan, Lewis & Bockius LLP

(57) ABSTRACT

A polar code-based decoding method may comprise: converting a plurality of LLRs of calculation-target bits into a plurality of absolute (ABS) LLR values; sorting the plurality of ABS LLR values in order of size so that a minimum ABS LLR value is designated from among the plurality of ABS LLR values; multiplying the minimum ABS LLR value by a preset weight; and updating path metrics (PMs) of the calculation-target bits in an order in which the plurality of ABS LLR values are sorted, wherein the updating of the PMs of the calculation-target bits comprises, even when a specific ABS LLR value of a specific calculation-target bit is equal or similar to the minimum ABS LLR value, updating a PM of the specific calculation-target bit with the minimum ABS LLR value multiplied by the preset weight.

18 Claims, 9 Drawing Sheets

(56) References Cited

U.S. PATENT DOCUMENTS

| | | |
|---|---|---|
| 11,133,829 B2 | 9/2021 | Zhang et al. |
| 11,894,863 B2 * | 2/2024 | Sunwoo ............ H03M 13/6572 |
| 2017/0111060 A1 * | 4/2017 | Huang .................. H03M 13/13 |
| 2022/0231785 A1 * | 7/2022 | Beery ................... H04L 1/0052 |

OTHER PUBLICATIONS

S. A. Hashemi, C. Condo and W. J. Gross, "Fast Simplified Successive-Cancellation List Decoding of Polar Codes," 2017 IEEE Wireless Communications and Networking Conference Workshops (WCNCW), San Francisco, CA, USA, 2017, pp. 1-6, doi: 10.1109/WCNCW.2017.7919044.

S. A. Hashemi, C. Condo and W. J. Gross, "Fast and Flexible Successive-Cancellation List Decoders for Polar Codes," in IEEE Transactions on Signal Processing, vol. 65, No. 21, pp. 5756-5769, 1 Nov. 1, 2017, doi: 10.1109/TSP.2017.2740204.

* cited by examiner

POLAR CODE-BASED DECODING METHOD AND APPARATUS

CROSS-REFERENCE TO RELATED APPLICATIONS

This application claims priority to Korean Patent Application No. 10-2022-0160355, filed on Nov. 25, 2022, with the Korean Intellectual Property Office (KIPO), the entire contents of which are hereby incorporated by reference.

BACKGROUND

1. Technical Field

Exemplary embodiments of the present disclosure relate in general to a polar code-based decoding method and apparatus for recovering performance which is degraded when a fast simplified successive cancellation list (SCL) with single parity check (SPC) nodes (fast-SSCL-SPC) decoding algorithm is applied to a channel with a single-bit resolution.

2. Related Art

Polar codes are error correction codes for minimizing errors of a communication channel having noise and have low complexity in encoding processes and decoding processes.

In successive cancellation (SC) decoding which is a polar code decoding method, bits are sequentially decoded, and thus information on non-decoded bits cannot be used.

In successive cancellation list (SCL) decoding which is another polar code decoding method, a specific number of candidate codes are maintained by considering the probability that each bit is 0 or 1, and thus error correction performance is high. However, SCL decoding has higher latency and lower throughput than SC decoding.

As an existing technology devised to solve this problem, there is a fast simplified SCL with single parity check (SPC) node (fast-SSCL-SPC) decoding algorithm. According to this algorithm, two or more bits are put together into one of four types of special nodes and decoded together. Fast-SSCL-SPC decoding shows the same performance level as SCL decoding and also high throughput.

The above-described fast-SSCL-SPC decoding ensures a high code rate and error correction performance for a large list size. However, the fast-SSCL-SPC decoding shows poorer performance in 1-bit quantization than SCL decoding due to a specific decoding method of SPC nodes which are one type of special nodes used for pruning.

In particular, when information received from a communication channel corresponds to an extremely low resolution having a small number of less than five bits, a decoder cannot find the minimum of log likelihood ratios (LLRs) of nodes in a decoding process, and thus path metrics (PMs) are not properly updated. This is because performance is notably degraded due to extreme quantization based on a small number of less than five bits.

As described above, a polar code-based decoding method, particularly, a polar code-based decoding method employing pruning, requires a method of increasing throughput without additional loss.

SUMMARY

Accordingly, exemplary embodiments of the present disclosure are provided to substantially obviate one or more problems due to limitations and disadvantages of the related art.

Exemplary embodiments of the present disclosure provide a polar code-based decoding method and apparatus which have high throughput and error correction performance equivalent to that of the related art.

Exemplary embodiments of the present disclosure also provide a polar-code decoding method and apparatus employing modified pruning which prevent performance degradation even in an extremely low resolution channel state, that is, even when quantization based on a small number of less than five bits is required.

Exemplary embodiments of the present disclosure provide a polar code-based decoding method and apparatus which may effectively update a path metric (PM) even when a minimum log likelihood ratio (LLR) value is equal to an LLR value of a current path.

Exemplary embodiments of the present disclosure provide a polar code-based decoding method and apparatus which may solve the problem of performance degradation through a PM update reflecting a weight when a fast simplified successive cancellation list (SCL) with single parity check (SPC) nodes (fast-SSCL-SPC) decoding algorithm for pruning a decoding tree is applied to a channel with a single-bit resolution among SCL decoding algorithms which are error correction techniques.

In some exemplary embodiments, a polar code-based decoding method performed by a processing unit of a decoding apparatus includes converting a plurality of LLRs of calculation-target bits into a plurality of absolute (ABS) LLR values, sorting the plurality of ABS LLR values in order of size so that a minimum ABS LLR value is designated from among the plurality of ABS LLR values, multiplying the minimum ABS LLR value by a preset weight, and updating PMs of the calculation-target bits in the order in which the plurality of ABS LLR values are sorted.

The updating of the PMs of the calculation-target bits may include, even when a specific ABS LLR value of a specific calculation-target bit is equal or similar to the minimum ABS LLR value, updating a PM of the specific calculation-target bit with the minimum ABS LLR value multiplied by the preset weight. Here, the specific ABS LLR value similar to the minimum ABS LLR value may represent a case in which the PM of the specific calculation-target bit is not properly updated because the specific ABS LLR value of the specific calculation-target bit is not equal to the minimum ABS LLR value but has a relatively small difference.

The decoding method may further include maintaining the minimum ABS LLR value for a certain time period corresponding to a calculation time of the calculation-target bits or for a preset number of PM updates.

The multiplying of the minimum ABS LLR value by the preset weight may be performed by a shift add multiplier.

The weight may be 0.75.

The decoding method may further include obtaining a parity value by performing an exclusive OR (XOR) operation on hard decision (HD) results of the plurality of LLRs.

The updating of the PMs of the calculation-target bits may include adding or subtracting the minimum ABS LLR value multiplied by the weight to or from a current ABS LLR value of a current calculation-target bit according to the parity value.

The updating of the PMs of the calculation-target bits may further include adding a previous PM and a value obtained by adding or subtracting the minimum ABS LLR value multiplied by the weight to or from the current ABS LLR value.

The decoding method may further include outputting two PMs which are obtained by duplicating a previous PM and a value obtained by adding or subtracting the minimum ABS LLR value multiplied by the weight to or from the current ABS LLR value as a first current PM corresponding to a probability for 0 and a second current PM corresponding to a probability for 1.

In other exemplary embodiments, a polar code-based decoding method performed by a processing unit of a decoding apparatus includes setting a number of path splittings to a smaller value of a list size and a node size of a decoding tree to which a successive cancellation list (SCL) algorithm is applied, comparing a position of a current calculation-target bit with the smaller value, performing path splitting when it is determined that the position of the current calculation-target bit is smaller than the smaller value, and making an HD when it is determined that the position of the calculation-target bit is not smaller than the smaller value.

The path splitting may include converting a plurality of LLRs of calculation-target bits into a plurality of ABS LLR values, sorting the plurality of ABS LLR values in order of size so that a minimum ABS LLR value is designated from among the plurality of ABS LLR values, multiplying the minimum ABS LLR value by a preset weight, and updating PMs of the calculation-target bits in the order in which the plurality of ABS LLR values are sorted. The updating of the PMs of the calculation-target bits may include, even when a specific ABS LLR value of a specific calculation-target bit is equal or similar to the minimum ABS LLR value, updating a PM of the specific calculation-target bit with the minimum ABS LLR value multiplied by the preset weight.

The decoding method may further include initializing the PMs to decode the calculation-target bits.

The decoding method may further include determining whether the position of the current calculation-target bit is smaller than the node size and, when the position of the calculation-target bit is smaller than the node size, returning to the comparing of the current calculation-target bit with the smaller value to perform path splitting or make an HD repeatedly until the position of the current calculation-target bit is not smaller than the node size.

The decoding method may further include verifying decoding results of the calculation-target bits including one pair of PMs obtained by updating a PM of each of the calculation-target bits under an even-parity constraint.

In other exemplary embodiments, a polar code-based decoding apparatus includes a processor configured to decode a message according to a program or command stored in a memory. The processor performs operations of converting a plurality of LLRs of calculation-target bits into a plurality of ABS LLR values, sorting the plurality of ABS LLR values in order of size so that a minimum ABS LLR value is designated from among the plurality of ABS LLR values, multiplying the minimum ABS LLR value by a preset weight, and updating PMs of the calculation-target bits in the order in which the plurality of ABS LLR values are sorted.

In the operation of updating the PMs of the calculation-target bits, even when a specific ABS LLR value of a specific calculation-target bit is equal or similar to the minimum ABS LLR value, the processor updates a PM of the specific calculation-target bit with the minimum ABS LLR value multiplied by the preset weight.

The processor may further perform an operation of maintaining the minimum ABS LLR value for a certain time period corresponding to a calculation time of the calculation-target bits or for a preset number of PM updates.

The processor may perform an operation of multiplying the minimum ABS LLR value by the preset weight through a shift add multiplier.

The processor may further perform an operation of obtaining a parity value by performing an XOR operation on HD results of the plurality of LLRs.

In the operation of updating the PMs of the calculation-target bits, the processor may add or subtract the minimum ABS LLR value multiplied by the weight to or from a current ABS LLR value of a current calculation-target bit according to the parity value.

In the operation of updating the PMs of the calculation-target bits, the processor may add a previous PM and a value obtained by adding or subtracting the minimum ABS LLR value multiplied by the weight to or from the current ABS LLR value.

The processor may further perform an operation of outputting two PMs which are obtained by duplicating a previous PM and a value obtained by adding or subtracting the minimum ABS LLR value multiplied by the weight to or from the current ABS LLR value as a first current PM corresponding to a probability for 0 and a second current PM corresponding to a probability for 1.

In other exemplary embodiments, a polar code-based decoding method includes converting, by a modulo operation module or an ABS module, a plurality of LLRs into a plurality of ABS LLR values, sorting, by a compare tree (CT) module, the plurality of ABS LLR values in order of size, multiplying, by a hardware adder or a shift and add module, a first ABS LLR value which is a currently minimum of the plurality of ABS LLR values by a preset weight, adding or subtracting, by an adder-subtractor, the first ABS LLR value to or from the first ABS LLR value multiplied by the weight, and outputting, by an adder and multiplexers (MUXs), two PMs which are obtained by duplicating a previous PM and a value obtained through the adder-subtractor as a first current PM corresponding to a probability for 0 and a second current PM corresponding to a probability for 1.

In other exemplary embodiments, a polar code-based decoding method includes setting a number of path splittings to a smaller value of a list size and a node size corresponding to the number of correct answer candidates to designate the number of LLR values, finding a minimum of the plurality of LLR values and sorting the plurality of LLR values, initializing a PM, increasing a position of a calculation-target bit by 1, determining whether the position of a calculation-target bit is smaller than the preset number of path splittings, and performing path splitting when the position of the calculation-target bit is smaller than the number of path splittings. The path splitting includes performing, by an adder-subtractor, an add/subtract operation between a current ABS LLR value and a minimum ABS LLR value according to a parity value calculated by performing an XOR operation, through an XOR module, on the plurality of LLR values passed through an HD module.

The decoding method may further include, when the position of the calculation-target bit is not smaller than the number of path splittings, making an HD.

The performing of the path splitting may include multiplying a minimum LLR by a weight through a shift-and-add operation.

The decoding method may further include outputting or storing two PMs which are obtained by duplicating a value obtained through the path splitting and a previous PM as current PM values corresponding to a probability for 0 and a probability for 1.

The decoding method may further include, when it is determined that a position of a current calculation-target bit is smaller than the preset number of path splittings, returning to the increasing of the position of the calculation-target bit to calculate a PM of a subsequent calculation-target bit, The decoding method may further include, when it is determined that a position of a current calculation-target bit is not smaller than the preset number of path splittings, confirming an even-parity constraint.

In other exemplary embodiments, a polar code-based decoding apparatus includes a processor configured to execute a program command stored in a memory. The processor performs operations of setting a number of path splittings to a smaller value of a list size and a node size to designate the number of LLR values, finding a minimum of the plurality of LLR values and sorting the plurality of LLR values, initializing a PM, increasing a position of a calculation-target bit by 1, determining whether the position of a calculation-target bit is smaller than the preset number of path splittings, and performing path splitting when the position of the calculation-target bit is smaller than the number of path splittings.

The path splitting includes performing, by an adder-subtractor, an add/subtract operation between a current ABS LLR value and a minimum ABS LLR value according to a parity value calculated by performing an XOR operation, through an XOR module, on the plurality of LLR values passed through an HD module.

The processor may further perform, when the position of the calculation-target bit is not smaller than the number of path splittings, an operation of making an HD.

In the operation of performing the path splitting, the processor may multiply a minimum LLR by a weight through a shift-and-add operation of a shift add multiplier.

The processor may further perform an operation of outputting two PMs which are obtained by duplicating a value obtained through the path splitting and a previous PM as current PM values corresponding to a probability for 0 and a probability for 1.

The processor may further perform, when it is determined that a position of a current calculation-target bit is smaller than the preset number of path splittings, an operation of returning to the operation of increasing the position of the calculation-target bit to calculate a PM of a subsequent calculation-target bit, The processor may further include, when it is determined that a position of a current calculation-target bit is not smaller than the preset number of path splittings, an operation of confirming an even-parity constraint.

In other exemplary embodiments, a polar code-based decoding method includes sorting, by a CT module, LLRs calculated by a modulo operation module in order of ABS value, designating a minimum of the LLRs sorted through the CT module as a minimum LLR, updating PMs in the order in which the LLRs other than the minimum LLRs are sorted, performing, by an XOR module, an XOR operation on LLR values passing through an HD module to calculate a parity value, multiplying the minimum LLR by a weight through a shift-and-add operation of a shift add multiplier, adding or subtracting the minimum ABS LLR value multiplied by the weight to or from a current ABS LLR value according to the calculated parity value, and outputting or storing two PMs which obtained by duplicating a value obtained through the add/subtract operation and a previous PM as one pair of current PM values corresponding to a probability for 0 and a probability for 1.

In other exemplary embodiments, a polar code-based decoding method includes a pruning processing unit including an SPC operator (OP). The SPC OP is configured to sort LLRs calculated by a modulo operation module in order of ABS value, designate a minimum of the sorted LLRs as a minimum LLR, update PMs in the order in which the LLRs other than the minimum LLRs are sorted, calculate a parity value by performing an XOR operation through an XOR module on LLR values passing through an HD module, multiply the minimum LLR by a weight through a shift-and-add operation, perform an add/subtract operation between a current ABS LLR value and the minimum ABS LLR value multiplied by the weight according to the calculated parity value, and output two PMs which are obtained by duplicating a value obtained through the add/subtract operation and a previous PM as current PM values corresponding to a probability for 0 and a probability for 1.

In other exemplary embodiments, a polar code-based decoding apparatus includes a processor configured to execute a program command stored in a memory. The processor performs operations of sorting ABS values of LLRs calculated by a modulo operation module through a CT module, designating a minimum of the values sorted through the CT module as a minimum LLR, updating PMs in the order in which the LLRs other than the minimum LLRs are sorted, calculating a parity value by performing an XOR operation through an XOR module on LLR values passing through an HD module, multiplying the minimum LLR by a weight through a shift-and-add operation, performing an add/subtract operation between a current ABS LLR value and the minimum ABS LLR value multiplied by the weight according to the calculated parity value, and outputting two PMs which are obtained by duplicating a value obtained through the add/subtract operation and a previous PM as on pair of current PM values corresponding to a probability for 0 and a probability for 1.

The weight may be more than 0 and less than 1.

According to the present disclosure, it is possible to provide a polar code-based decoding method and apparatus which have high throughput and also error correction performance equivalent to that of the related art.

According to the present disclosure, it is also possible to provide a decoding method and apparatus employing modified pruning which can prevent performance degradation even when 1-bit quantization is required.

According to the present disclosure, even when a minimum LLR value is equal to an LLR value of a current path, it is possible to properly update a PM by multiplying the minimum LLR value by a weight.

According to the present disclosure, it is also possible to effectively recover performance which is degraded when a fast-SSCL-SPC decoding algorithm obtained by pruning an SCL decoding algorithm which is an error correction technique is applied to a channel with a single-bit resolution.

According to the present disclosure, it is also possible to provide a polar code-based decoding method and apparatus which are suitable for an extremely low resolution channel and thus applicable to a semiconductor memory environment as well as a wireless communication environment.

DETAILED DESCRIPTION OF THE EMBODIMENTS

Figure 1:
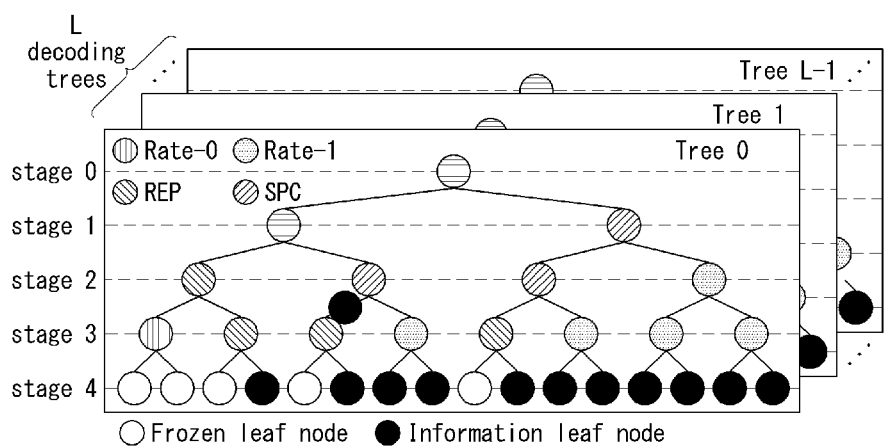
FIG. 1 is an example diagram illustrating a decoding tree that may be used in a polar code-based decoding method according to an exemplary embodiment of the present disclosure.

Exemplary embodiments of the present disclosure are disclosed herein. However, specific structural and functional details disclosed herein are merely representative for purposes of describing exemplary embodiments of the present disclosure. Thus, exemplary embodiments of the present disclosure may be embodied in many alternate forms and should not be construed as limited to exemplary embodiments of the present disclosure set forth herein.

Accordingly, while the present disclosure is capable of various modifications and alternative forms, specific exemplary embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular exemplary embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

FIG. 1 is an example diagram illustrating a decoding tree that may be used in a polar code-based decoding method according to an exemplary embodiment of the present disclosure.

In general, polar code repeatedly uses capacity polarization in which two channels with the same capacity are changed into two channels with different capacities. When channel capacities are bipolarized, channels with low indices have a capacity of 0, and channels with high indices have a capacity of 1. Channel capacities corresponding to N input bits which are calculated as described above are calculated, and K indices with high channel capacities are selected from among the indices. A predetermined bit (generally 0) is input to N−K bits with low channel capacities, and the N−K bits are referred to as frozen bits or fixed bits. Here, when message bits are input to the K indices and an output of N bits is referred to as a codeword, a polar code has a code rate of (N−K)/N. A representative method of decoding a message encoded using such a polar code is successive cancellation (SC) decoding. SC decoding is configured to find a message input of each index in order of message index.

Referring to FIG. 1, a decoding apparatus performs each node operation of the decoding tree on the basis of SC decoding to decode a polar code having a code length N of 16. The decoding apparatus may include a processing unit as at least a partial element of tree structure hardware for each node operation.

A decoding process begins using N input likelihood ratio (LLR) values. There is one LLR value corresponding to each bit, and the LLR value represents whether the corresponding bit is close to 0 or 1. With the progress of decoding according to the decoding tree, LLR values are updated, and different calculations are performed depending on whether to go down to a left node or a right node.

In FIG. 1, the decoding tree may include rate-0 nodes, rate-1 nodes, repetition (REP) nodes, single parity check (SPC) nodes, frozen nodes, information nodes, and the like. The frozen nodes may include frozen leaf nodes, and the information nodes may include information leaf nodes.

Here, the rate-0 nodes represent nodes of which all lower nodes are fixed bits. The rate-1 nodes represent nodes of which all lower nodes are information bits. The REP nodes represent nodes having connected lower nodes of which only the uppermost bit is an information bit, and other nodes are fixed bits. The SPC nodes represent nodes having connected lower nodes of which only one is a fixed bit, and other nodes are information bits.

The SC decoding-based tree structure has high latency in a decoding process and a relatively large hardware area. To solve these problems in SC decoding, an SC decoding-based pruning decoding technique may be used.

Representative SC decoding-based pruning decoding techniques include simplified SC (SSC) decoding, simplified successive cancellation list (SSCL) decoding, fast-SSC decoding, fast-SSCL decoding, syndrome check decoding, and the like. In the case of SSC decoding or SSCL decoding, a decoding tree is pruned of rate-0 nodes and rate-1 nodes. In the case of fast-SSC decoding or fast-SSCL decoding, nodes of a decoding tree are classified into subdivided types, and then decoding is performed by applying different calculations depending on the type of node. Maximum likelihood (ML)-SSC may be employed as a decoding process. Such decoding is finished with two clock cycles, and thus latency can be notably reduced.

Figure 2:
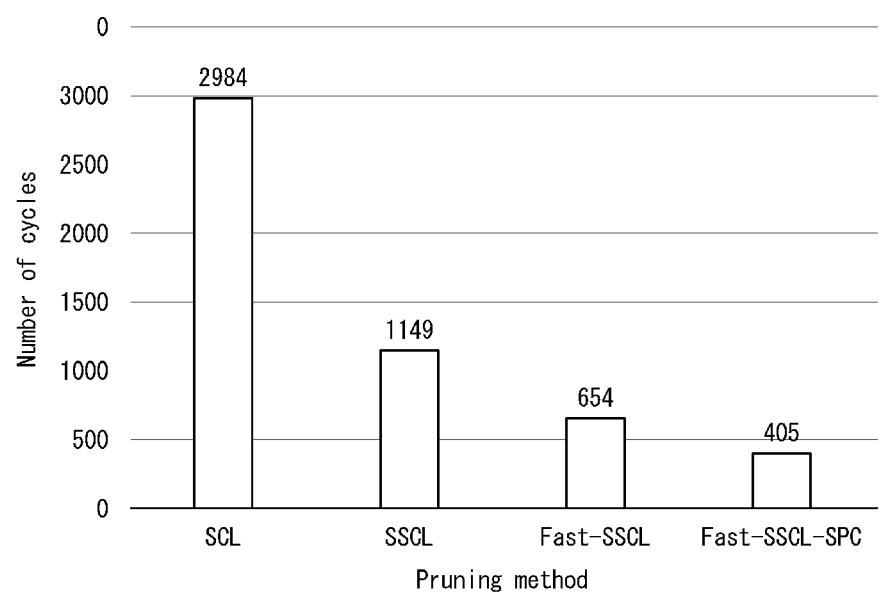
FIG. 2 is a graph comparatively showing the numbers of time cycles corresponding to several pruning methods that are taken into consideration in a polar code-based decoding method according to an exemplary embodiment of the present disclosure.

FIG. 2 is a graph comparatively showing the numbers of time cycles corresponding to several pruning methods that are taken into consideration in a polar code-based decoding method according to an exemplary embodiment of the present disclosure.

Referring to FIG. 2, time cycles of SCL decoding and three pruning methods are shown. A code used in a simulation may have a code length of 1024 symbols, a code rate of 0.9, a channel quantization list size of 16, a 16-bit fifth generation (5G) cyclic redundancy check (CRC) polynomial, and a maximum special node length of 128.

Results of the simulation show that fast-SSCL-SPC decoding which shows about an 86% reduction in the number of cycles compared to SCL decoding is very useful for high throughput in a wireless communication environment, a memory environment, or the like.

Fast-SSCL-SPC decoding may employ four types of special nodes in total. Each type of special node has a specific pattern of a frozen node and an information node. When fast-SSCL-SPC decoding is performed on a node having such a pattern, a special node may be reached while a decoding tree is searched for a path metric (PM) of the node, and then all bits may be decoded using information that the decoding tree has. Accordingly, fast-SSCL-SPC decoding can greatly increase throughput while having the same performance as SCL decoding.

When a code rate is high or a list size is large, fast-SSCL-SPC decoding ensures excellent error correction performance. However, when channel information is quantized using a certain number of bits or less, the performance is notably degraded due to a specific decoding method for SPC nodes which are one type of special node.

Here is the main reason for this. The most important information received from a channel is an LLR value. In the case of decoding an SPC node, differences between LLR values of calculated-target bits become insignificant due to quantization based on a small number of bits. As a result, it is not possible to find a minimum LLR value in many cases.

An LLR or LLR value at an SPC node represents reliability of the node or a calculation-target bit of the node. For this reason, in polar code-based decoding, frozen bits are assigned to most unreliable channels, and information bits are assigned to most reliable channels.

Also, since an SPC node has a pattern of one frozen bit and other information bits, the frozen bit may be assumed to be a bit having a minimum LLR value. Accordingly, in SPC node decoding, a minimum LLR value may be searched for to decode a frozen bit first, and then other information bits may be decoded at a time.

Meanwhile, in fast-SSCL-SPC decoding, it is very important to find a minimum LLR value. However, when channel LLR values are obtained using a small number of bits, all the plurality of LLR values become similar values or the same value, and thus it is not possible to detect an accurate LLR value. For this reason, even in the case of going down in a decoding tree or giving a very large resolution with a floating point (FP), it is not possible to accurately distinguish LLRs of calculation-target bits from each other due to the LLRs obtained using a small number of bits.

Figure 3:
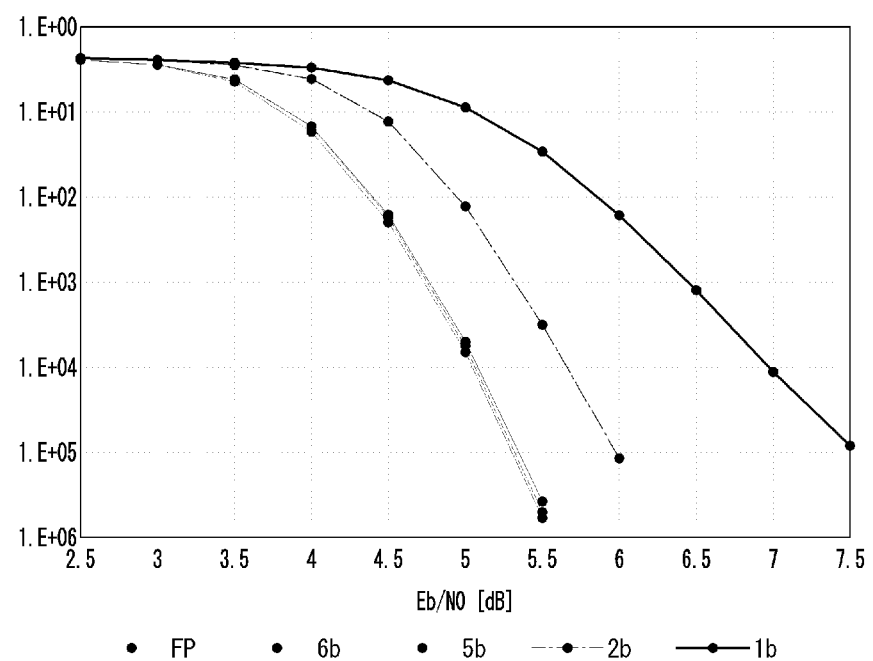
FIG. 3 is a graph comparatively showing bit error rates (BERs) when several channels of a polar code decoder are quantized according to a comparative example.

FIG. 3 is a graph comparatively showing bit error rates (BERs) when several channels of a polar code decoder are quantized according to a comparative example.

FIG. 3 comparatively shows error correction performance measured by applying quantization with several resolutions when fast-SSCL-SPC decoding is used.

A code used in a simulation may have a code length of 1024 symbols, a code rate of 0.9, a channel quantization list size of 4, and a 16-bit 5G CRC polynomial. It is seen that there is a significant difference in error correction performance between FP and 1-bit resolutions and between FP and 2-bit resolutions among FP, 6-bit 6$b$, 5-bit 5$b$, 2-bit 2$b$, and 1-bit 1$b$ resolutions.

In other words, results of comparing performance depending on the number of bits are used for channel quantization, that is, BERs, show very similar performance to FP down to 5 bits 5$b$, but the performance is notably degraded when a smaller number of bits are used for quantization.

A storage, for example, a flash memory, is configured to give 1 bit to a channel LLR. Accordingly, when fast-SSCL-SPC decoding is applied to the flash memory, fast-SSCL-SPC decoding shows similar performance to SCL decoding or lower performance than SCL decoding.

Meanwhile, fast-SSCL-SPC decoding of the comparative example has PMs, that is, a specific metric for a path of each correct answer candidate, and a higher penalty corresponding to such a specific metric corresponds to a poorer bit. Accordingly, fast-SSCL-SPC decoding is configured to select a PM with the lowest penalty.

According to such a PM update method of the comparative example, a current absolute (ABS) LLR value of a current calculation-target bit is added to a previous PM of a previous calculation-target bit, and a minimum ABS LLR value is selectively added under the even-parity constraint or the previous PM is output without any change. Here, when the current LLR value is equal to the minimum LLR value, in other words, when the two LLR values are substantially indistinguishable, the current LLR value is offset by the minimum LLR value according to a parity value under the condition of (1-2γ), and thus the previous PM is output as a current PM without any change. As a result, the current PM is not updated, which is problematic.

A PM update used for updating a PM of an SPC node in fast-SSCL-SPC decoding of the comparative example may be represented as Equation 1 below.

$$PM_{i\_curr} = \begin{cases} PM_{i\_previous} + |\alpha_{i\_curr}| + (1-2\Upsilon)|\alpha_{i\_min}|, & \text{if } \eta_i \neq \text{sgn}(\alpha_i), \\ PM_{i\_previous}, & \text{otherwise.} \end{cases} \quad \text{[Equation 1]}$$

In the comparative example, when a current LLR value and a minimum LLR value are not distinguished due to extreme quantization or a low resolution, the same value is added and subtracted as shown in Equation 1, and thus a PM is not updated.

Therefore, according to the comparative example, a PM may not be properly updated because a minimum LLR value of a node is not found in a decoding process based on an extremely low resolution.

Meanwhile, in a decoding method according to this exemplary embodiment, when a minimum LLR value is added to a current LLR value, the minimum LLR value is multiplied by a specific weight. Accordingly, even when the minimum LLR value is equal to the current LLR value, the current LLR value is not offset by the minimum LLR value, and thus a current PM which is different from a previous PM is automatically updated and output. Therefore, in a polar code-based decoding process, performance may not be degraded even by an extremely low resolution channel.

A modified PM update method that may be employed in the decoding method of this exemplary embodiment is represented as Equation 2 below.

$$PM_{i\_curr} = \begin{cases} PM_{i\_previous} + |\alpha_{i\_curr}| + (1-2\Upsilon)|\alpha_{i\_min}| \times \text{weight}, & \text{if } \eta_i \neq \text{sgn}(\alpha_i), \\ PM_{i\_previous}, & \text{otherwise.} \end{cases} \quad \text{[Equation 2]}$$

As shown in Equation 2, according to the decoding method of this exemplary embodiment, a minimum LLR value is multiplied by a preset weight rather than 1 or 0. Accordingly, even when a current LLR value is equal to the minimum LLR value, the current LLR value is not offset by the minimum LLR value, and thus a current PM can be properly updated.

More specifically, in Equation 2, the condition "if $\eta_i \neq \text{sgn}(\alpha_i)$" represents that a minimum ABS LLR value to which a weight is applied is added to or subtracted from a current ABS LLR value according to whether a bit to be determined in a current path is 0 or 1. In other words, the sign function sgn( ) is a function that outputs the sign of a certain real number. In other words, the function outputs −1 when the certain real number is a negative value, and outputs +1 when the certain real number is a positive value. When the sign function is used, a current path $\eta_i$ is compared with the sign function. When the current path $\eta_i$ does not match the sign function, the path has low reliability, and thus a penalty may be added.

In the case of adding a penalty, the minimum LLR value may be added to the current LLR value. Here, when the two LLR values are the same or undistinguishable and a parity is 1, (1-2γ) of Equation 2 equals −1, and thus the current PM is not updated. As described above, the decoding method of the comparative example has a problem that it is not possible to fully impose a penalty on an unreliable node.

Therefore, in this exemplary embodiment, an LLR value is multiplied by a preset weight so that a current PM can be unconditionally updated even when a current LLR value is equal to the minimum LLR value, that is, a penalty can be unconditionally imposed on the current PM determined to have low reliability.

In particular, a weight is given to a minimum LLR value rather than a current LLR value because all bits do not have the same current LLR value but have the same minimum LLR value. In this way, since the same penalty is imposed regardless of weight other than 0 or 1 given to a minimum LLR value, that is, because it is appropriate and fair to give any weight other than 0 or 1 to a minimum LLR value, it is most preferable to give a weight to a minimum LLR value.

Figure 4:
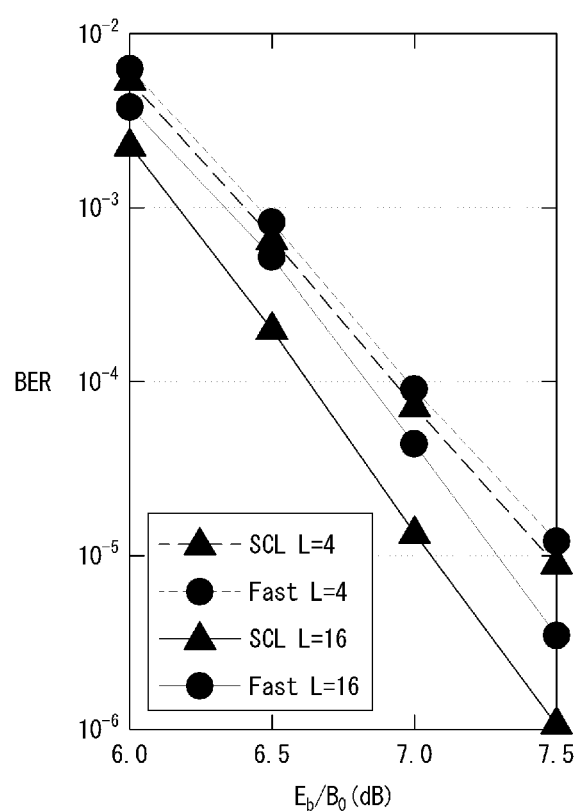
FIG. 4 is a graph illustrating performance of SCL decoding of a comparative example and fast-SSCL-SPC decoding of another comparative example when an input value has undergone 1-bit quantization.

FIG. 4 is a graph illustrating performance of SCL decoding of a comparative example and fast-SSCL-SPC decoding of another comparative example when an input value has undergone 1-bit quantization.

In FIG. 4, the y axis represents a BER, and the x axis represents a ratio $E_b/N_0$ of energy per bit ($E_b$) to a noise power spectral density ($N_0$). $E_b/N_0$ may correspond to a value obtained by dividing signal power by a user bitrate rather than a channel symbol rate.

Referring to FIG. 4, SCL decoding having a specific list size (L=4 or L=16) has relatively high error correction performance but shows high latency and low throughput. Also, performance of fast-SSCL-SPC decoding having a specific list size (L=4 or L=16) is degraded when an input value undergoes 1-bit quantization, because PMs are not properly updated.

In general, fast-SSCL-SPC decoding shows higher performance than SCL decoding. The larger the list size, the higher the performance. However, when quantization based on a small number of bits, such as one bit, is performed and pruning is applied, fast-SSCL-SPC decoding may show lower performance than SCL decoding. In other words, when the list size L increases from 4 to 16, performance of fast-SSCL-SPC decoding is degraded more than performance of SCL decoding.

As described above, performance of fast-SSCL-SPC decoding of the comparative example is notably degraded when quantization based on a small number of less than five bits, particularly 1-bit quantization, is performed.

Figure 5:
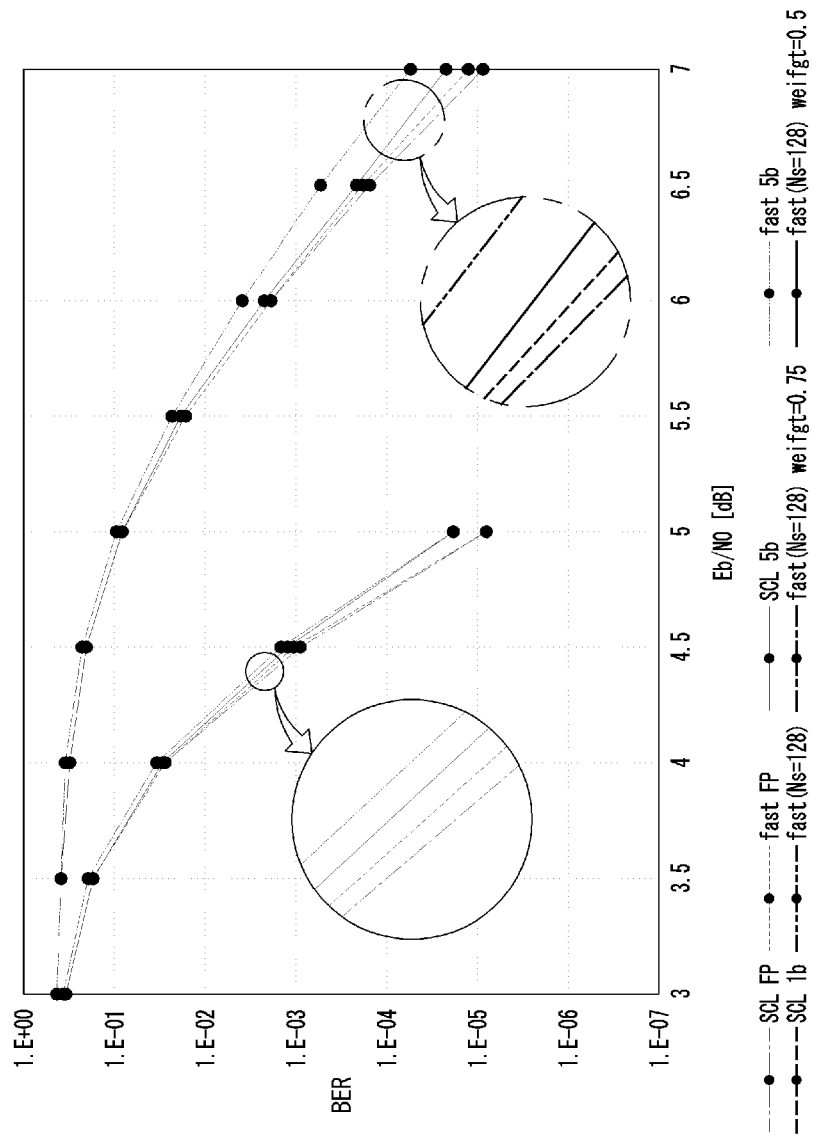
FIG. 5 is a graph comparatively showing BERs of polar code-based decoding according to this exemplary embodiment and polar code decoding according to comparative examples.

FIG. 5 is a graph comparatively showing BERs of polar code-based decoding according to this exemplary embodiment and polar code decoding according to comparative examples.

Referring to FIG. 5, channel quantization error correction performance of the modified PM update method in which a weight is applied according to this exemplary embodiment and comparative examples in which a weight is not applied (SCL, FP, fast FP, SCL 5b, fast 5b, SCL 1b, and fast (Ns=128)) may be comparatively checked. A code used in the simulation may have a code length of 1024 symbols, a code rate of 0.9, a channel quantization list size of 16, a 16-bit 5G CRC polynomial, and a maximum special node length of 128.

Results of the simulation show that this exemplary embodiment in which a weight is set to 0.5 or 0.75 has the same decoding performance as SCL 1b.

Figure 6:
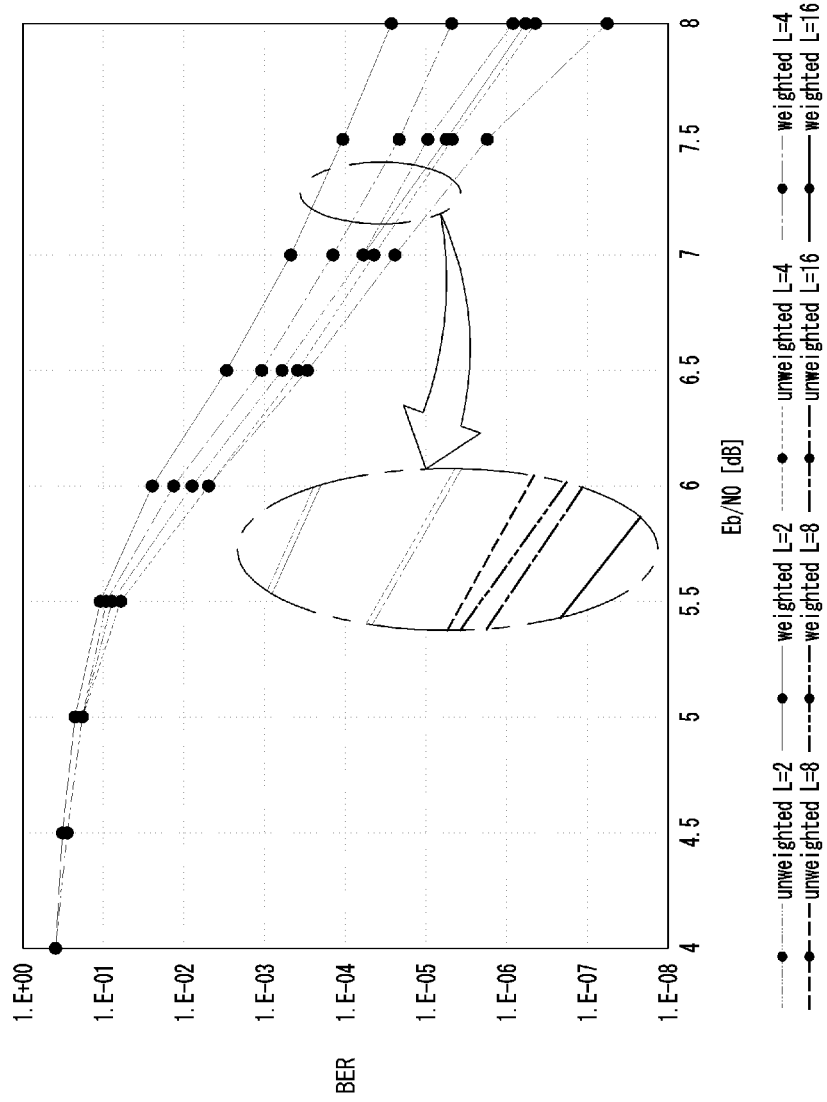
FIG. 6 is a graph comparatively showing BERs according to various list sizes in decoding methods of this exemplary embodiment and comparative examples.

FIG. 6 is a graph comparatively showing BERs according to various list sizes in decoding methods of this exemplary embodiment and comparative examples.

Referring to FIG. 6, error correction performance of this exemplary embodiment in which a weight is set to 0.75 (weighted) and comparative examples in which no weight is applied (unweighted) may be comparatively checked according to various sizes. A code used in the simulation may have a code length of 4096 symbols, a code rate of 0.9, a 16-bit 5G CRC polynomial, and a maximum special node length of 128.

Results of the simulation show that it is difficult to distinguish LLR values with an increase in the size of a 1-bit channel quantization list because performance is more affected.

In this exemplary embodiment, a weight of 0.75 is set in consideration of the most appropriate hardware shape for a computing apparatus. When the weight of 0.75 is used, it is possible to simply give a weight to a minimum LLR value through a shift add multiplier and also minimize the size of hardware for giving the weight.

As described above, the decoding method of this exemplary embodiment shows higher performance than decoding methods of the comparative examples.

In the above description, polar codes are codes that use the channel polarization phenomenon initially proposed by Arikan in 2008 and may replace existing turbo codes or low density parity check (LDPC) codes. A polar code may have a code rate of (N−K)/N. Channel polarization is a phenomenon in which the same capacity of several channels is changed into different capacities. Also, an extremely low resolution channel may be a channel having low-resolution information which is represented by a small number of bits. The small number of bits indicates less than five bits.

It is currently known that fast-SSCL-SPC decoding obtained by applying pruning to SCL decoding shows the best performance among polar code-based error correction techniques. However, when SC decoding, such as fast-SSCL-SPC decoding, to which pruning is applied is applied to a channel with a low resolution corresponding to a small number of bits, performance is notably degraded. Therefore, according to this exemplary embodiment, a weight is applied to a minimum LLR value so that the product is distinguished from LLR values of calculation-target bits. In this way, a PM of any one of all the calculation-target bits is prevented from not being updated.

Figure 7:
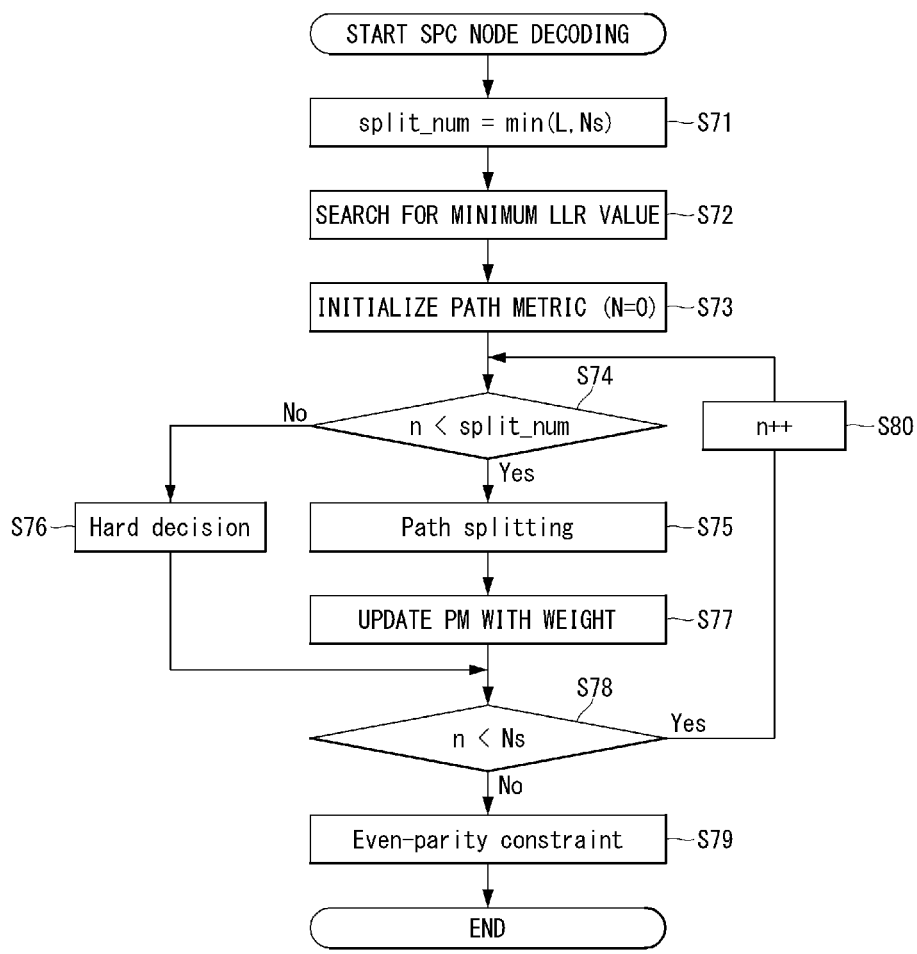
FIG. 7 is a flowchart illustrating a polar code-based decoding method according to an exemplary embodiment of the present disclosure.

FIG. 7 is a flowchart illustrating a polar code-based decoding method according to an exemplary embodiment of the present disclosure. In other words, FIG. 7 is a flowchart of a decoding algorithm of an SPC node in a fast-SSCL-SPC decoding process.

In FIG. 7, a main process of the decoding method according to this exemplary embodiment is related to PM updates in a path splitting operation.

According to polar code-based decoding, in the case of decoding a plurality of LLR values input from channels through an input terminal of a decoding apparatus, the LLR values are updated at nodes of a decoding tree while going down in the decoding tree, and when the LLR values arrive at special nodes, the LLR values stored at the nodes of the decoding tree may be finally used.

Specifically, the decoding apparatus may designate a number Ns of LLR values (S71). That is, the decoding apparatus may define the number of bits, that is, a node size. In other words, the decoding apparatus may set the number of path splittings to the smaller one of a list size and the node size. The list size may represent the number of correct answer candidates or the number of decoding paths, and the node size may represent the length of special nodes.

Subsequently, the decoding apparatus may search for a minimum LLR value among the plurality of LLR values (S72). In this operation, ABS values of the plurality of LLR values may be calculated and sorted in order of size, and then the minimum LLR value may be found from among the sorted ABS LLR values.

Subsequently, PMs may be initialized (S73). This operation is intended to newly start path splitting to determine a PM for a current calculation-target bit. Initializing a PM may include loading a previous PM value of a previous calculation-target bit.

Subsequently, the decoding apparatus may determine whether the position of the current calculation-target bit is smaller than the previously set number of path splittings on the basis of the order of sizes of the ABS LLR values determined to search for the minimum LLR value (S74).

When it is determined in the operation S74 that the position of the current calculation-target bit is smaller than the number of path splittings, the decoding apparatus may perform a path splitting (S75). On the other hand, when the position of the current calculation-target bit is not smaller than the number of path splittings, the decoding apparatus may make a hard decision (S76).

The path splitting S75 is a process in which an adder-subtractor adds a current ABS LLR value and the minimum ABS LLR value or subtracts the minimum ABS LLR value from the current ABS LLR value according to a parity obtained by performing an exclusive OR (XOR) operation on LLR values passing through an HD module. In other words, when the parity is 1, the minimum ABS LLR value is added to the current ABS LLR value, and a penalty is imposed.

The decoding method of this exemplary embodiment may include an operation of multiplying the minimum ABS LLR value by a weight through a shift-and-add operation in the path splitting S75 to perform a path update normally even when the current ABS LLR value and the minimum ABS LLR value are undistinguishable because they are the same or have a small difference.

In particular, when a shift add multiplier for a shift-and-add operation is used, the operation of multiplying the minimum ABS LLR value by the weight can be performed simply.

In addition, when the weight is 0.75, it is possible to perform a multiplication operation through a simplified shift-and-add operation compared to a case of using at least one real number other than 0.75 selected within a range from larger than 0 to less than 1. In this way, it is possible to minimize a hardware area for adding the weight to path splitting.

As described above, the path splitting S75 of this exemplary embodiment may be completed through a PM update operation S77 employing the weight.

Meanwhile, an ABS LLR value obtained through the above path splitting, that is, the path splitting S75 and S77 including the PM update employing the weight, may be added to a previous PM value by an adder. Subsequently, the decoding apparatus may obtain duplicated PM values by duplicating an output value of the adder or duplicating the previous PM value without any change. In other words, these operations S75 and S77 may be configured to output two PM values obtained by duplicating the previous PM value and the ABS LLR value obtained through the path splitting S75 and S77 using the adder and multiplexers as one pair of current PM values corresponding to probabilities for 0 and 1.

Subsequently, a processing unit of the decoding apparatus may determine whether a position of the current calculation-target bit is smaller than the number Ns of calculation-target bits of the current decoding process (S78). In other words, it may be determined whether a decoding process has been performed for all the calculation-target bits.

When it is determined in the operation S78 that the position of the current calculation-target bit is smaller than the number Ns of calculation-target bits, that is, when a decoding process has not been performed for all the calculation-target bits, the process may proceed back to the specific operation S74 through an operation S80 of increasing the position to calculate a PM of a subsequent calculation-target bit.

Meanwhile, when it is determined in the operation S78 that the position of the current calculation-target bit is not smaller than the number Ns of calculation-target bits, it may be determined whether the decoding process has been properly performed according to the even-parity constraint (S79).

According to this exemplary embodiment, even when a decoding apparatus fails to find a minimum LLR value for decoding an SPC node with LLRs of channels quantized at a low resolution corresponding to a small number of less than five bits, PMs are properly updated so that decoding can be performed successfully. In other words, according to this exemplary embodiment, it is possible to prevent or recover from performance degradation occurring in SCL-based decoding when channel information is received using a small number one bit or less than five bits.

Figure 8:
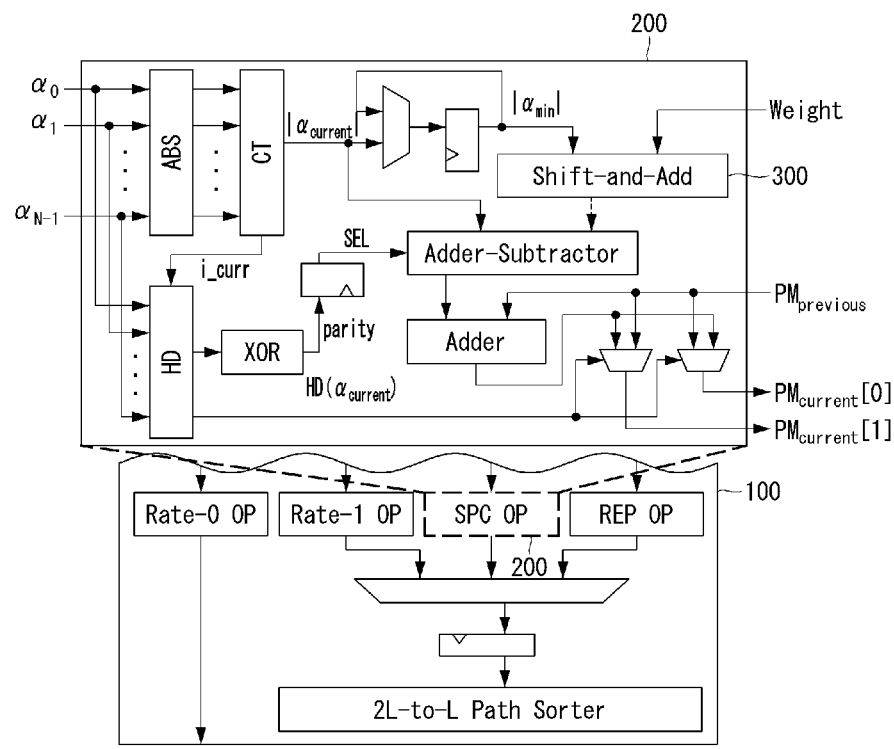
FIG. 8 is a block diagram showing a main configuration of a polar code-based decoding apparatus according to another exemplary embodiment of the present disclosure.

FIG. 8 is a block diagram showing a main configuration of a polar code-based decoding apparatus according to another exemplary embodiment of the present disclosure.

Referring to FIG. 8, a processing unit 100, that is, a pruning processing unit, installed in a polar code decoder (hereinafter, "decoder") which is a decoding apparatus of this exemplary embodiment may be configured so that a path sorter sorts a plurality of ($2^nL$ (n is any natural number of 1 or more)), for example, 2L, candidate paths on the basis of operators (OPs) which perform calculation for pruning nodes of the decoder and PMs duplicated through calculation of the OPs and leaves L candidate paths.

The OPs include a first operator or a rate-0 OP for performing calculation of a rate-0 node, a second operator or a rate-1 OP for performing calculation of a rate-1 node, a REP OP for performing calculation of a REP node, an SPC OP 200 for performing calculation of an SPC node, and the like. All these OPS may be modules that perform calculation for special nodes. The decoding apparatus of this exemplary embodiment may have a difference in structure or operation of the SPC OP 200 compared to an existing decoding apparatus.

Among all operations of the decoding apparatus, a node decoding method of the SPC OP 200 will be mainly described below.

The SPC OP 200 is configured to perform calculation by receiving a plurality of, for example, N (which is defined as a power of 2 and may have a value of 4, 8, 16, or the like), LLR values $\alpha_0, \alpha_1, \ldots,$ and $\alpha_{N-1}$ and a previous PM value $PM_{previous}$ and then output two duplicated PM values $PM_{current}[0]$ and $PM_{current}[1]$ for a current PM value.

In other words, the SPC OP 200 may convert the plurality of LLR values into a plurality of ABS LLR values through an ABS module which is a modulo operation module, designate the smallest ABS LLR value as a minimum ABS LLR value $|\alpha_{min}|$ by sorting the plurality of ABS LLR values through a compare tree (CT) module, and properly update a PM of a current calculation-target bit by selectively adding or subtracting the minimum ABS LLR value to which a weight is applied to or from the current ABS LLR $|\alpha_{current}|$ according to a parity while performing SPC calculation on the current ABS LLR $|\alpha_{current}|$ in the order in which the plurality of ABS LLRs are sorted.

Here, the plurality of LLR values may be subjected to an HD operation by an HD module. An HD may generate a result that a current calculation-target bit is 0 or 1 according to whether a current LLR value is a positive value or a negative value. When an XOR module performs an XOR operation on LLR values passing through the HD module to calculate a parity, an adder-subtractor may perform an add/subtract operation of adding or subtracting the minimum ABS LLR value to or from a current ABS LLR according to the parity value.

Here, the minimum ABS LLR value $|\alpha_{min}|$ may be multiplied by the weight through a shift-and-add operation. The weight may be provided from a weight storage part or weight maintenance part (see 230 of FIG. 9) provided in advance or an element performing a function corresponding to the part to a shift add multiplier 300.

A value obtained through calculation of the adder-subtractor may be added to a previous PM value through an adder. In other words, the value obtained through the adder-subtractor may be output from the SPC OP 200 as two PMs duplicated together with the previous PM value according to an HD result for a current LLR $HD(\alpha_{current})$. The two current PMs may be a first current PM $PM_{current}[0]$ corresponding to a probability for 0 and a second current PM $PM_{current}[1]$ corresponding to a probability for 1.

Here, outputting the two current PMs as $PM_{current}[0]$ and $PM_{current}[1]$ may be processed by two multiplexers that receive the value from the adder and the previous PM value as two inputs.

As described above, in the decoding apparatus, a minimum ABS LLR value to which a weight is applied is provided to an adder-subtractor. Accordingly, when the adder-subtractor adds or subtracts the minimum ABS LLR value to or from a current ABS LLR value according to a parity, it may be difficult to distinguish between the current ABS LLR value and the minimum ABS LLR value, that is, a minimum ABS LLR value before the weight is applied, because the current ABS LLR value and the minimum ABS LLR value are the same or have a slight difference. Even in this case, the adder-subtractor properly updates a current PM of a current calculation-target bit corresponding to the current ABS LLR value, and thus it is possible to prevent performance degradation of the decoding apparatus despite an extremely low resolution channel having a resolution of less than five bits, particularly 1-bit resolution. In other words, it is possible to enhance performance and reliability of the polar code-based decoding apparatus which performs decoding through an improved pruning method.

Figure 9:
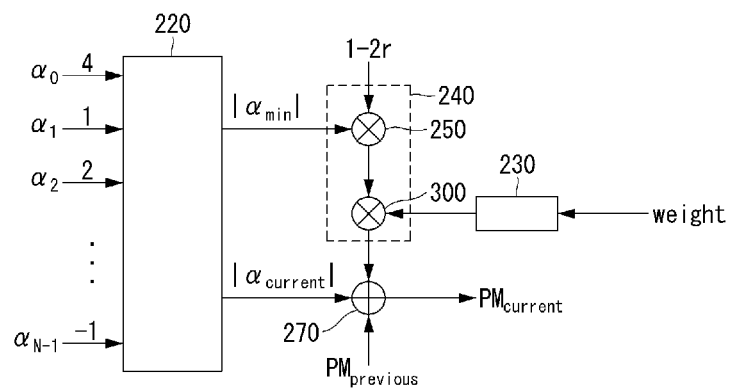
FIG. 9 is a schematic diagram illustrating a weight-applied PM update process which may be employed in the decoding apparatus of FIG. 8.

FIG. 9 is a schematic diagram illustrating a weight-applied PM update process which may be employed in the decoding apparatus of FIG. 8.

Referring to FIG. 9, the decoding apparatus may include an ABS CT module 220, a weight-applied minimum module 240, and an adder-subtractor 270.

The ABS CT module 220 may include a unit or element that converts the plurality of LLR values $\alpha_0, \alpha_1, \ldots,$ and $\alpha_{N-1}$ acquired from a channel of a message to be decoded into a plurality of ABS LLR values and sorts the plurality of ABS LLR values. In FIG. 9, LLRs, that is, LLR values, input to the ABS CT module 220 are illustrated as 4, 1, 2, −1, and the like. The ABS CT module 220 may be a combination of the ABS module of FIG. 8 and a CT module.

The weight-applied minimum module 240 may include a first unit or element for applying a weight to the minimum ABS LLR value $|\alpha_{min}|$ and a second unit or element for applying a parity to the minimum ABS LLR value $|\alpha_{min}|$. The first unit or element may be implemented as the shift add multiplier 300 which performs a shift-and-add operation as shown in FIG. 8. The second unit or element may include a parity processing module 250 which multiplies the minimum ABS LLR value $|\alpha_{min}|$ by $(1-2\gamma)$ (see Equation 2).

The adder-subtractor 270 may operate to add or subtract the minimum ABS LLR value $|\alpha_{min}|$ to which a weight is applied to or from the current ABS LLR value $|\alpha_{current}|$ according to a parity value. As shown in FIG. 8, the adder-subtractor 270 may correspond to an adder-subtractor which selectively performs an add or subtract operation.

The parity processing module 250 and the shift add multiplier 300 have been described as functionally separate elements for convenience of description but are not limited thereto. The parity processing module 250 and the shift add multiplier 300 may be implemented as a single software module or a single hardware element. For example, the parity processing module 250 and the shift add multiplier 300 may be configured as the weight-applied minimum module 240 in the form of a single multiplier.

The weight may be transmitted to the shift add multiplier 300 through the weight storage part or weight maintenance part 230.

According to a modified example, the parity processing module 250 may set an operating mode of the adder-subtractor 270 so that the adder-subtractor 270 adds or subtract a minimum ABS LLR value to which a weight has not been applied yet to or from a current ABS LLR value provided for an add or subtract operation to the adder-subtractor 270 according to a parity value. Also, the parity processing module 250 may set an operating mode of the adder-subtractor 270 so that the adder-subtractor 270 adds or subtracts a minimum ABS LLR value to which a weight has been applied to or from a current ABS LLR value provided for an add or subtract operation to the adder-subtractor 270 according to a parity value (not shown).

Here, setting of an operating mode may be a process in which a control signal, an enable signal, or a disable signal is input to determine any one calculation mode of an add operation and a subtract operation of the adder-subtractor 270.

In addition, according to the above description, the parity processing module 250 may be combined with the adder-subtractor 270. In this case, the adder-subtractor 270 combined with the parity processing module 250 may operate to add or subtract a minimum ABS LLR value to which a weight is applied to or from a current ABS LLR value according to a parity value.

As described above, in a decoding process, LLR values basically increase while going down in a decoding tree, and a difference between LLR values of a plurality of calculation-target bits increases accordingly. When decoding to which pruning is applied is performed, the process does not proceed below a certain node of the decoding tree, and thus a difference between a plurality of LLRs initially received from a channel does not increase so much. Therefore, the plurality of LLR values have a slight difference and become difficult to distinguish.

For example, when determined LLR values of a certain special node are the same, one of the LLR values with a minimum index may be selected as a minimum value. Also, when the LLR values are the same, a parity is 1, and a parity application value becomes −1 under the condition of $(1-2\gamma)$. Accordingly, the minimum LLR value functions as a negative value against a current LLR value, that is, the current LLR value is offset by the minimum LLR value, so that a previous PM value is output as a current PM value without any change in a PM update process.

As described above, when a current LLR value is identical or similar to a minimum LLR value or slightly different from the minimum LLR value and thus is not distinguishable from the minimum LLR value, a decoding process of the comparative example has a problem in that a previous PM becomes a current PM without being updated, that is, a current PM is not updated.

Meanwhile, an SPC node is a special node with one frozen node and thus is under the even-parity constraint. In particular, an SPC node has one frozen bit according to the predetermined definition of a pattern. Accordingly, when a bit with the smallest LLR value is selected, the bit becomes the most unreliable bit, that is, a frozen bit. Accordingly, in SPC node decoding, a bit with the smallest LLR value may be searched for, and a found bit, that is, a frozen bit, may be decoded first.

Also, in SPC node decoding, a parity is calculated first. A parity has a value of 0 or 1 according to what current bits are like or states of the current bits, that is, according to LLR values. In other words, when bit calculation is performed on HD results through an XOR module in a parity calculation process, it is possible to know a current parity value. Therefore, this exemplary embodiment may be configured to add or subtract a minimum ABS LLR value to which a weight is applied to or from a current ABS LLR value using a parity, that is, according to whether a parity of calculation-target bits is 0 or 1, during a PM update.

Figure 10:
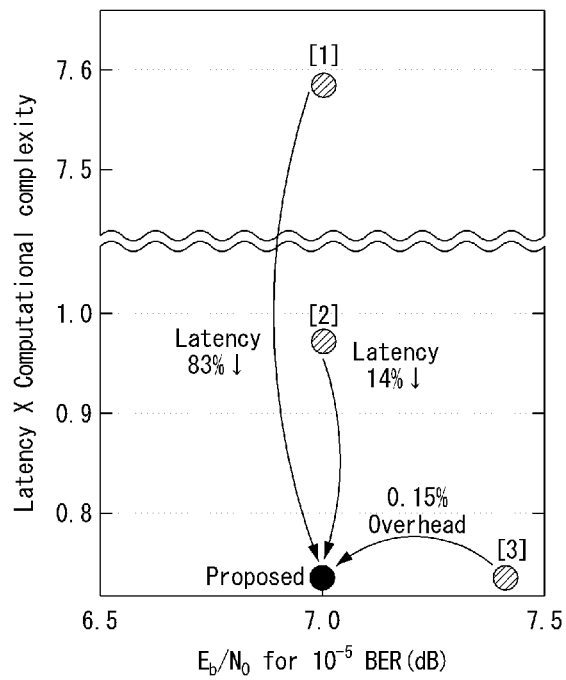
FIG. 10 is a graph illustrating effects improved by the decoding apparatus of FIG. 8.

FIG. 10 is a graph illustrating effects improved by the decoding apparatus of FIG. 8. Also, FIG. 10 is a comparative graph obtained by normalizing products of latency and computational complexity.

In FIG. 10, computational complexity is estimated by calculating the areas and the number of basic modules that occupy most of a apparatus area. Modules taken into consideration are a 2-input adder, an ABS value module, a 2-input comparator, a 2-to-1 multiplexer, an XOR module, and a shift add multiplier (simply, "shift adder"). Latency is defined as a minimum number of time cycles required for performing each decoding algorithm.

In FIG. 10, when a decoder is positioned further left on the x axis, the decoder has higher performance according to $E_b/N_0$ at $10^{-5}$ BER (dB), and when a decoder is positioned lower on the y axis, the decoder has shorter latency and higher computational complexity.

Referring to FIG. 10, the decoding apparatus has much higher performance than comparative example 1 [1], comparative example 2 [2], and comparative example 3 [3]. In other words, a proposed embodiment of the present disclosure shows latency which is reduced by about 83% compared to comparative example 1 [1] and about 14% compared to comparative example 2 [2], and shows overhead which is reduced by about 0.15% compared to comparative example 3 [3].

In FIG. 10, comparative example 1 [1] is an SCL algorithm-based decoder in which no weight is applied, comparative example 2 [2] is a fast-SSCL algorithm-based decoder in which no weight is applied, and comparative example 3 [3] is a fast-SSCL-SPC algorithm-based decoder in which no weight is applied.

Figure 11:
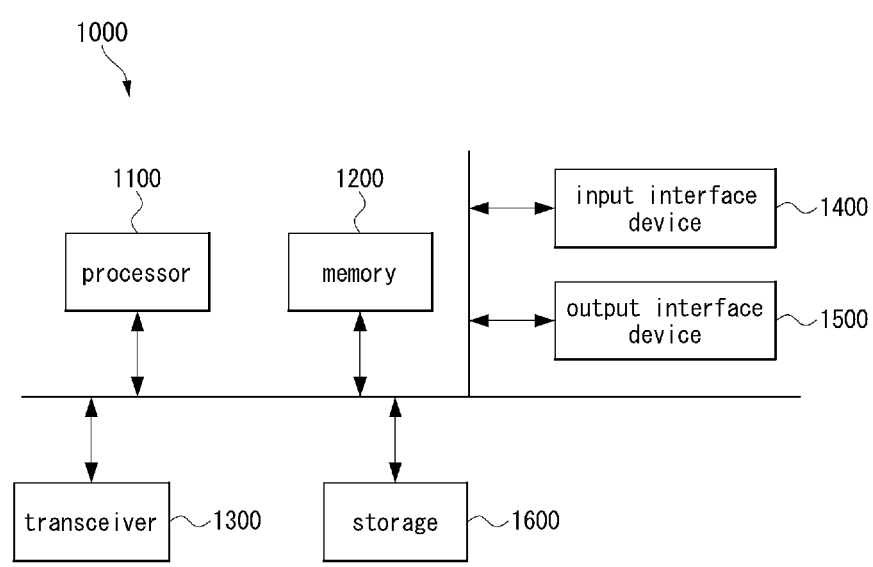
FIG. 11 is a schematic block diagram showing a main configuration of a polar code-based decoding apparatus according to still another exemplary embodiment of the present disclosure.

FIG. 11 is a schematic block diagram showing a main configuration of a polar code-based decoding apparatus according to still another exemplary embodiment of the present disclosure. Referring to FIG. 11, a decoding apparatus 1000 may include at least one processor 1100. In addition, the decoding apparatus 1000 may selectively include a memory 1200, a transceiver 1300, an input interface device 1400, an output interface device 1500, a storage 1600, or a combination thereof. Components included in the decoding apparatus 1000 may be connected through a bus and communicate with each other.

The decoding apparatus 1000 of this exemplary embodiment may include a pruning processing unit (see 100 of FIG. 8) or an SPC operator. The SPC operator may be installed in the processor 110. Also, the SPC operator may be stored in the storage 1600 as a program or a software module and may be loaded into the processor 1100 and run as necessary. The SPC operator may correspond to the SPC operator 200 which has been described above with reference to FIG. 8 or 9 and performs a PM update using a weight.

The processor 1100 may perform a program command stored in at least one of the memory 1200 and the storage 1600. The program command may include a command for performing at least one of the operations of the decoding method of FIG. 7. The program command may be implemented as at least one software module.

The processor 1100 may be a central processing unit (CPU), a graphics processing unit (GPU), or a dedicated processor for performing at least one of methods according to exemplary embodiments of the present disclosure.

Each of the memory 1200 and the storage 1600 may be configured as at least one of a volatile storage medium and a non-volatile storage medium. For example, the memory 1200 may be configured as at least one of a read-only memory (ROM) and a random-access memory (RAM).

The transceiver 1300 includes a unit which supports communication with an external device through a network, or an element which performs a function corresponding to the unit. The transceiver 1300 may include at least one sub-communication system for wired communication, wireless communication, satellite communication, or a combination thereof.

The input interface device 1400 may include input units, such as a keyboard, a microphone, a touchpad, a touchscreen, and the like, and an input signal processing part which maps a signal input through at least one selected from among the input units to a prestored command or processes the signal and transmits the result to the processor 1100.

The output interface device 1500 may include an output signal processing part which maps a signal output according to control of the processor 1100 to a prestored form of signal or a prestored signal level or processes the signal, and at least one output unit which outputs a signal or information in the form of vibrations, light, or the like according to a signal of the output signal processing part. The at least one output unit may include at least one selected from output units such as a speaker, a display device, a printer, a light output device, a vibration output device, and the like.

The decoding apparatus 1000 may be implemented as at least a partial function part or element of a computing device, such as a personal computer (PC) or the like, a web server, a multimedia server, an application server, a database server, a file server, a game server, a mail server, a proxy server, or a combination thereof.

Also, the decoding apparatus 1000 may include a wireless terminal or a wired/wireless terminal which is a combination of wireless and wired terminals. The wireless terminal may include a mobile terminal, a mobile station, an advanced mobile station, a high-reliability mobile station, a subscriber station, a portable subscriber station, an access terminal, user equipment, a satellite terminal, or the like.

The decoding apparatus 1000 is a terminal or device which performs decoding on the basis of a polar-code algorithm in a suitable manner for an extremely low resolution channel and has a communication function for communicating with an external device through a network, and may be referred to as a communication node.

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. A polar code-based decoding method performed by a single parity check (SPC) operator included in a polar code-based decoding apparatus, comprising:

converting, through a modulo operation module, a plurality of log likelihood ratios (LLRs) of calculation-target bits into a plurality of absolute (ABS) LLR values;

sorting, through a compare tree (CT), the plurality of ABS LLR values in order of size so that a minimum ABS LLR value is designated from among the plurality of ABS LLR values;

multiplying, through a shift add multiplier, the minimum ABS LLR value by a preset weight; and updating, through at least one adder and at least one subtractor, path metrics (PMs) of the calculation-target bits in an order in which the plurality of ABS LLR values are sorted, wherein the updating of the PMs of the calculation-target bits comprises, even when a specific ABS LLR value of a specific calculation-target bit is equal or similar to the minimum ABS LLR value, updating a PM of the specific calculation-target bit with the minimum ABS LLR value multiplied by the preset weight, and wherein the modulo operation module, the CT, the shift add multiplier, and the at least one adder and the at least one subtractor are included in the SPC operator.

2. The polar code-based decoding method of claim 1, further comprising maintaining the minimum ABS LLR value for a certain time period corresponding to a calculation time of the calculation-target bits or for a preset number of PM updates.

3. The polar code-based decoding method of claim 1, wherein the preset weight is 0.75.

4. The polar code-based decoding method of claim 1, further comprising obtaining a parity value by performing an exclusive OR (XOR) operation on hard decision (HD) results of the plurality of LLRs.

5. The polar code-based decoding method of claim 4, wherein the updating of the PMs of the calculation-target bits comprises adding or subtracting the minimum ABS LLR value multiplied by the preset weight to or from a current ABS LLR value of a current calculation-target bit according to the parity value.

6. The polar code-based decoding method of claim 5, wherein the updating of the PMs of the calculation-target bits further comprises adding a previous PM and a value obtained by adding or subtracting the minimum ABS LLR value multiplied by the preset weight to or from the current ABS LLR value.

7. The polar code-based decoding method of claim 5, further comprising outputting two PMs which are obtained by duplicating a previous PM and a value obtained by adding or subtracting the minimum ABS LLR value multiplied by the preset weight to or from the current ABS LLR value as a first current PM corresponding to a probability for 0 and a second current PM corresponding to a probability for 1.

8. A polar code-based decoding method, performed by a decoding apparatus including a processor and a pruning processing unit having a single parity check (SPC) operator, comprising:

setting, by the processor, a number of path splittings to a smaller value of a list size and a node size of a decoding tree to which a successive cancellation list (SCL) algorithm is applied;

comparing, by the processor, a position of a current calculation-target bit with the smaller value;

performing, by the SPC operator, path splitting when it is determined that the position of the current calculation-target bit is smaller than the smaller value; and making, through a hard decision (HD) module, a hard decision when it is determined that the position of the current calculation-target bit is not smaller than the smaller value, wherein the SPC operator performs the path splitting by:

converting, through a modulo operation module, a plurality of log likelihood ratios (LLRs) of calculation-target bits into a plurality of absolute (ABS) LLR values;

sorting, through a compare tree (CT), the plurality of ABS LLR values in order of size so that a minimum ABS LLR value is designated from among the plurality of ABS LLR values;

multiplying, through a shift add multiplier, the minimum ABS LLR value by a preset weight; and updating, through at least one adder and at least one subtractor, path metrics (PMs) of the calculation-target bits in the order in which the plurality of ABS LLR values are sorted, wherein the updating of the PMs of the calculation-target bits comprises, even when a specific ABS LLR value of a specific calculation-target bit is equal or similar to the minimum ABS LLR value, updating a PM of the specific calculation-target bit with the minimum ABS LLR value multiplied by the preset weight.

9. The polar code-based decoding method of claim 8, further comprising initializing the PMs to decode the calculation-target bits.

10. The polar code-based decoding method of claim 9, further comprising:

determining whether the position of the current calculation-target bit is smaller than the node size; and when the position of the calculation-target bit is smaller than the node size, returning to the comparing of the current calculation-target bit with the smaller value to perform path splitting or make an HD repeatedly until the position of the current calculation-target bit is not smaller than the node size.

11. The polar code-based decoding method of claim 10, further comprising verifying decoding results of the calculation-target bits including one pair of PMs obtained by updating a PM of each of the calculation-target bits under an even-parity constraint.

12. A polar code-based decoding apparatus comprising a processor configured to decode a message according to a program or command stored in a memory and a single parity check (SPC) operator, wherein the processor performs operations of:

converting, through a modulo operation module included in the SPC operator, a plurality of log likelihood ratios (LLRs) of calculation-target bits into a plurality of absolute (ABS) LLR values;

sorting, through a compare tree (CT) included in the SPC operator, the plurality of ABS LLR values in order of size so that a minimum ABS LLR value is designated from among the plurality of ABS LLR values;

multiplying, through a shift add multiplier included in the SPC operator, the minimum ABS LLR value by a preset weight; and updating, through at least one adder and at least one subtractor included in the SPC operator, path metrics (PMs) of the calculation-target bits in the order in which the plurality of ABS LLR values are sorted, wherein, in the operation of updating the PMs of the calculation-target bits, even when a specific ABS LLR value of a specific calculation-target bit is equal or similar to the minimum ABS LLR value, the processor updates a PM of the specific calculation-target bit with the minimum ABS LLR value multiplied by the preset weight.

13. The polar code-based decoding apparatus of claim 12, wherein the processor further performs an operation of maintaining the minimum ABS LLR value for a certain time period corresponding to a calculation time of the calculation-target bits or for a preset number of PM updates.

14. The polar code-based decoding apparatus of claim 12, wherein the preset weight is 0.75.

15. The polar code-based decoding apparatus of claim 12, wherein the processor further performs an operation of obtaining a parity value by performing an exclusive OR (XOR) operation on hard decision (HD) results of the plurality of LLRs.

16. The polar code-based decoding apparatus of claim 15, wherein, in the operation of updating the PMs of the calculation-target bits, the processor adds or subtracts the minimum ABS LLR value multiplied by the preset weight to or from a current ABS LLR value of a current calculation-target bit according to the parity value.

17. The polar code-based decoding apparatus of claim 16, wherein, in the operation of updating the PMs of the calculation-target bits, the processor adds a previous PM and a value obtained by adding or subtracting the minimum ABS LLR value multiplied by the preset weight to or from the current ABS LLR value.

18. The polar code-based decoding apparatus of claim 16, wherein the processor further performs an operation of outputting two PMs which are obtained by duplicating a previous PM and a value obtained by adding or subtracting the minimum ABS LLR value multiplied by the preset weight to or from the current ABS LLR value as a first current PM corresponding to a probability for 0 and a second current PM corresponding to a probability for 1.

* * * * *